UNITED STATES PATENT OFFICE.

WILLIAM H. KELSEY, OF CLEVELAND, OHIO.

IMPROVEMENT IN ARTIFICIAL BONE-BLACK FOR FILTERING.

Specification forming part of Letters Patent No. 122,526, dated January 9, 1872.

*To all whom it may concern:*

Be it known that I, WILLIAM H. KELSEY, of Cleveland, in the county of Cuyahoga and State of Ohio, have invented a new and Improved Filtering Material; and I do hereby declare that the following is a full and clear description of the same.

The nature of this invention relates to a filtering material made of various kinds of earth or minerals, such as clay, shale, sulphate of lime, sulphate of barytes, and any earths or mineral substances that are sufficiently friable to be readily reduced to the fineness of ordinary sand, and to be otherwise prepared, as hereinafter described, for filtering oil and other substances, refining sugar, and other like purposes.

Different degrees of fineness may be used for different substances. Very limpid or volatile oils should have a finer, and heavy oils or sirups a coarser, material; and this mineral matter may be prepared in this particular by grinding and sifting, the different qualities varying from a tenth of an inch diameter and less to the fineness of beach sand.

The further preparation of this filtering material is as follows: After the earth or mineral matter has been ground and sifted it is placed in a pan, vessel, or retort, in which is first put a layer of bones which have been divested of their soft tissues but not burned. Upon this first layer of bones, which should be two or three inches in thickness, should be placed a layer of prepared mineral of equal thickness, and these layers should be alternated till the retort is full. The retort is then closed by a closely-fitting cover, and luted down with clay mortar to prevent, as much as possible, the escape of the gases generated by the subsequent heat. The retort, with its contents, is placed in a suitably-prepared furnace and subjected to a low red heat for about twenty-four hours, or until the bones have been thoroughly charred, the mineral, in the meantime, having, to a great extent, absorbed and retained the carbonaceous and other volatile matter set free from the bones during the process of calcination. The earthy or mineral matter becomes thus so heavily charged with carbonaceous matter that not only forms a filtering material nearly or quite equaling the animal charcoal of the bones, but, by fine grinding, may be used with advantage as a pigment for paint.

To prepare the contents of the retort for filtering purposes the charred bones should be reduced to the desired fineness by grinding and then equally incorporated with the remaining contents of the retort; or the calcined bones may be used separately as well as the earthy matter of the retort.

I also carbonize the earthy or mineral matter of the retort by means of animal substances, such as tissues, blood, and other soft parts of the body, or any other matters, whether animal or vegetable, that contain fat or animal matter, by mixing the ingredients in the retort in suitable proportions, as before stated, and subjecting the retort to the proper degree of heat, as set forth.

In preparing the soft animal matter and mineral matter for the retort they may be mixed together in the form of a mortar or pasty mass, and after calcination the compacted mass can be pulverized to the desired fineness.

When the carbonized earths or minerals have become foul or exhausted by filtering the mass may be renovated by simply reheating in the retort and otherwise fitted for use, as before stated.

What I claim as my improvement, and desire to secure by Letters Patent, is—

The filtering material or artificial bone-black, composed of either clay, shale, sulphate of lime, or sulphate of baryta, carbonized by the calcination of bones therewith, as specified.

WM. H. KELSEY.

Witnesses:
J. H. BURRIDGE,
D. L. HUMPHREY.